United States Patent
Crady

(12)
(10) Patent No.: US 6,595,298 B1
(45) Date of Patent: Jul. 22, 2003

(54) MULTI-PURPOSE WEEDER WITH AUGER

(76) Inventor: Morris A. Crady, 2022 Grand St., Jacksonville, FL (US) 32208

( * ) Notice: Subject to any disclaimer, the term of this patent is extended or adjusted under 35 U.S.C. 154(b) by 0 days.

(21) Appl. No.: 10/156,157

(22) Filed: May 28, 2002

(51) Int. Cl.[7] .............................................. A01B 33/00
(52) U.S. Cl. ..................... 172/41; 172/111; 172/371; 172/376; 172/378; 172/381; 172/532; 172/540; 30/276; 30/347; 30/500
(58) Field of Search .................... 30/500, DIG. 7, 30/347, 388, 389, 205, 206, 215, 216, 263, 264, 265, 276, 273.1; 366/343, 605, 603, 244, 245, 249, 251; 172/20, 19, 41, 42, 108, 111, 123, 518, 532, 540, 371–381

(56) References Cited

U.S. PATENT DOCUMENTS

| | | | | |
|---|---|---|---|---|
| 757,144 A | * | 4/1904 | Richardson | 366/343 |
| 843,399 A | * | 2/1907 | King | |
| 1,767,918 A | * | 6/1930 | Egbert | |
| 1,966,352 A | * | 7/1934 | Mahony | 366/343 |
| 2,214,142 A | * | 9/1940 | Mall | |
| 2,247,439 A | * | 7/1941 | Hawes | 366/343 |
| 2,278,398 A | * | 3/1942 | Wittman | 366/343 X |
| 2,574,237 A | * | 11/1951 | Barrow | |
| 2,575,978 A | * | 11/1951 | Scheidecker | 366/343 |
| 2,670,938 A | * | 3/1954 | Wittmann | 366/343 |
| 3,129,771 A | * | 4/1964 | Lidstone | |
| 3,166,303 A | * | 1/1965 | Chapman | 366/343 |
| 3,444,934 A | | 5/1969 | Alberto | |
| 3,554,293 A | | 1/1971 | Aman et al. | |
| 3,698,541 A | * | 10/1972 | Barr | 198/214 |
| 4,175,875 A | * | 11/1979 | Van Horbek | 366/343 |
| 4,213,504 A | * | 7/1980 | Schneider | 172/41 X |
| 4,242,002 A | * | 12/1980 | Kawabata | 366/343 |
| 4,472,063 A | * | 9/1984 | Eickelmann | 366/343 X |
| 4,720,219 A | * | 1/1988 | Masonek et al. | 408/201 |
| 4,723,802 A | | 2/1988 | Fambrough | |
| 4,901,800 A | * | 2/1990 | Wilson | 366/343 X |
| 5,013,193 A | * | 5/1991 | Rabo et al. | 408/201 |
| 5,449,254 A | * | 9/1995 | Beckner | 172/371 |
| 5,740,869 A | * | 4/1998 | Sandholzer | 172/378 |
| 6,115,935 A | * | 9/2000 | Collins et al. | 34/58 |
| 6,233,851 B1 | * | 5/2001 | Alexander et al. | 172/371 X |
| 6,311,782 B1 | * | 11/2001 | Plasek et al. | 172/41 X |
| 2002/0108762 A1 | * | 8/2002 | Lynch | 172/371 X |
| 2003/0066663 A1 | * | 4/2003 | McKill | 172/41 |

FOREIGN PATENT DOCUMENTS

| | | | |
|---|---|---|---|
| CH | 598741 | * | 5/1978 |
| DE | 3319217 A1 | * | 11/1984 |
| GB | 2082432 A | * | 3/1982 |
| WO | WO-90/06672 | * | 6/1990 |

* cited by examiner

*Primary Examiner*—Christopher J. Novosad
(74) *Attorney, Agent, or Firm*—Arthur G. Yeager

(57) ABSTRACT

A multi-purpose weeder attachable to a hand-held rotary power implement is designed to weed, aerate and till soil. A vertical shaft is removably attached to the implement to permit erect operation of the weeder. A pair of substantially spiral-shaped blades are rigidly connected at an acute angle with the lower end of shaft to cause discharge of weeds upwardly and outwardly from soil when the shaft is rotated. The blades are equally spaced from the shaft as they diverge upwardly. A top end of an auger is connected to the lower end of the shaft to penetrate weed and soil at its free end. An annular member with a cross horizontal element connects the upper ends of the blades to the shaft.

20 Claims, 3 Drawing Sheets

MULTI-PURPOSE WEEDER WITH AUGER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a multi-purpose weeder and, more particularly, to a weeder having an auger rigidly connected to a pair of spiral shaped blades for weeding, aerating and tilling soil.

2. Prior Art

A multiplicity of gardening tools and implements as well as numerous chemical preparations have been used in the past for deterring, removing or destroying a variety of undesirable weed and plant growths that appear in lawns, gardens or the like. Obviously, the presence of such growths greatly detracts from the appearance of the lawn or garden and most weeds have a detrimental and adverse effect upon surrounding desirable growth, such as vegetation and flowers. Unfortunately, the removal and destruction of weeds has not been accomplished to a desired degree. Cultivation of plants in close proximity thereto is not possible without injury to the plant, and breaking up of hard soils, such as dry clay, is difficult.

Many of the undesirable weed and plant growths include elaborate and complex root systems. Other growths incorporate roots of tough and stringy fibrous texture that are difficult to sever or remove from the surrounding earth. Because of these weed characteristics and difficulties being encountered when employing conventional gardening devices, weed growth is not inhibited. Usually, despite much effort, the root system of the weed is left behind only to regenerate the problem for another day.

U.S. Pat. Nos. 3,554,293 and 3,444,934 to Aman et al. and Alberto, respectively, disclose powered weeding devices having blade means for destroying weeds and spring-operated penetrating means for digging beneath the surface of the ground. Other weed extracting devices include U.S. Pat. Nos. 3,129,771 and 4,723,802 to Lidstone and Fambrough, respectively. Such devices penetrate beneath the ground by way of a sharp tip at the soil engaging section of the weeding devices. Such tools as described above have been developed for standing, stooping, or crouching upon the knees while being operated.

Unfortunately, after such devices have removed weeds, the topsoil is typically left in an undesirable condition for planting vegetables and bulbs, for example. Thus, the topsoil must be aerated and tilled with additional gardening devices before it is suitable for reuse. Locating and using additional devices is cumbersome because such tasks require time and effort. Accordingly, there is a need for a weeding device that can effectively remove a weed and prepare soil for planting a bulb, vegetation and/or a flower, for example.

BRIEF SUMMARY OF THE INVENTION

In view of the foregoing background, it is therefore an object of the invention to provide a multi-purpose weeder with an auger rigidly connected to a pair of spiral shaped blades for weeding, aerating and tilling soil. These and other objects, features, and advantages of the invention, are provided by a multi-purpose weeding apparatus preferably formed from steel and attachable to a hand-held rotary power implement. The weeder includes an elongated vertical shaft having a longitudinal axis between an upper end and a lower end and removably attachable to a power implement for causing rotation of the shaft about the axis. The shaft has a sufficient vertical length so that a user of the weeder may be generally erect while using the weeder. Advantageously, a user will more likely not get back pain from operating the present invention.

The weeder further includes a soil engaging section including a pair of substantially spiral-shaped blades having lower ends connected to the shaft and forming an acute angle with the shaft to cause discharge of weeds dug by the weeder upwardly and outwardly from soil when the shaft is rotated. An auger has a free end and a top end connected to the lower end of the shaft and is engagable with a weed and soil so that the weeder will penetrate a weed and simultaneously remove same from soil. Thereafter, the soil is left in a generally aerated and tilled condition for reuse. Advantageously, while unwanted weeds are being removed, the soil is aerated and tilled for planting vegetation, a flower, or a bulb, for example.

The weeder further includes an annular member and a cross horizontal element disposed within and connected at its opposed ends to the member. The element has a central aperture for receiving the shaft therethrough and is rigidly connected to the shaft about the aperture.

Each of the blades has an upper end rigidly affixed to at least the element and/or the member. The pair of opposed ends of the element may be spaced between about two inches and eight inches apart from each other. Each blade also has a sharpened edge extending between its upper and lower ends for cutting and removing weeds from soil wherein the blades are divergent from the shaft towards the element and converge in a substantially spiral path downward about the shaft. The shaft may have a diameter between about 0.25 inches to 0.50 inches.

The auger may be between about one-half inch to two inches long and may be a lag screw for penetrating into a weed and hard soil. Such a lag screw is approximately two inches long. The screw includes a plurality of spaced spiral projections for moving weed and soil upwardly therethrough to be expended above ground. Alternate to the lag screw, the free end of the auger may include a pair of spurs extending therefrom and a lead screw disposed substantially along the axis and between the spurs.

Each blade includes leading and trailing edges and generally planar surfaces between the edges wherein the leading edges are sharpened for initially contacting ground and removing a weed therefrom and the trailing edges are dull to inhibit accidental injury. The blades are offset approximately 180 degrees about the shaft and are equally spaced apart from the shaft substantially along the lengths of the blades. The blades also uniformly converge towards each other in a helical path from the upper end to the lower end of the shaft.

The weeder further comprises a rotary implement for rotating the shaft that is battery-powered. The implement may have direction control so that the weeder can be driven in one direction for penetrating ground and can be driven in an opposite direction for being removed from ground. The implement may also have variable speed control for adjusting the rotational speed of the shaft.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout, and prime and double prime notations are used to indicate similar elements in alternative embodiments.

Figure 1:
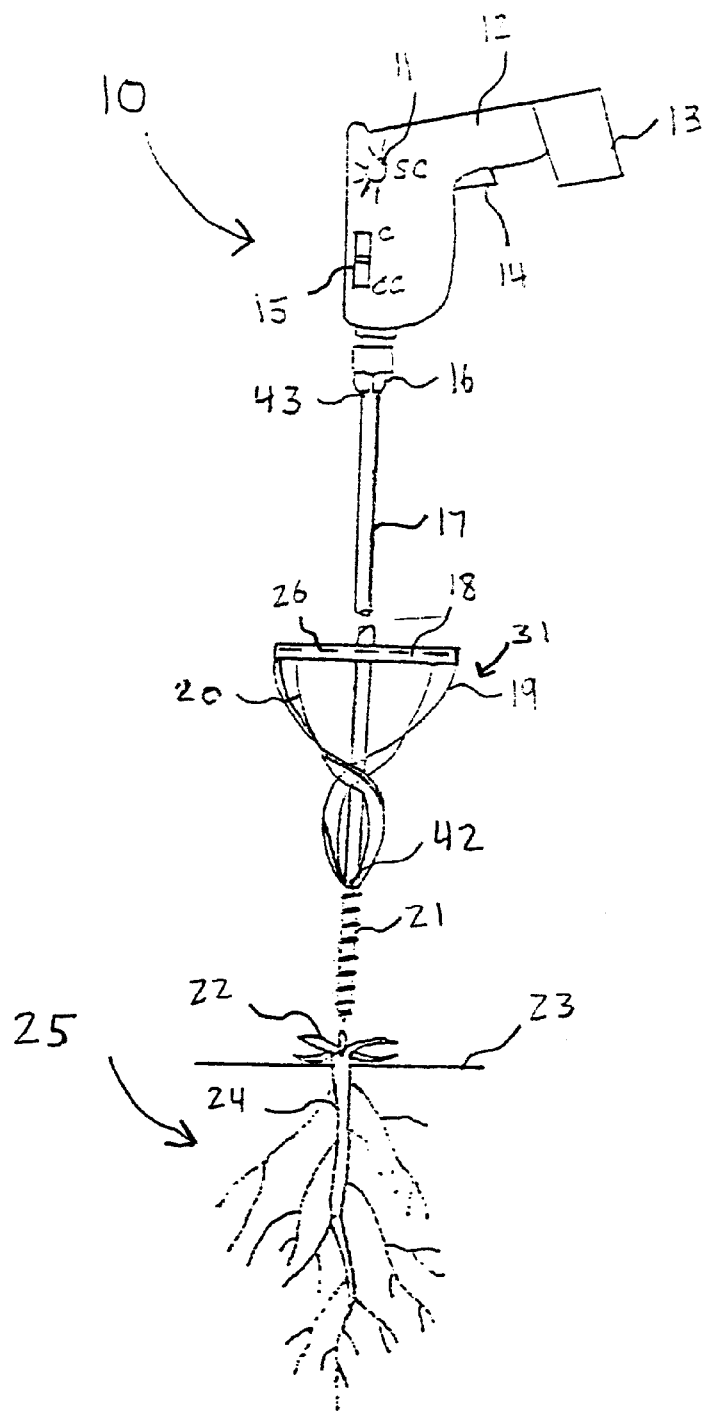
FIG. 1 is a front elevational view of a multi-purpose weeder for weeding, aerating and tilling soil, and is powered by a portable rotary power implement.

The weeder of this invention is referred to generally in FIG. 1 by the reference numeral 10. An undesired plant or weed 25 is shown growing above and below ground 23. Weeder 10 is shown as being in position to be placed on or adjacent the weed and into the ground for removing weed 25.

Weeder 10 includes an elongated shaft 17 having a lower end portion 42 carrying soil engaging section 31. The soil engaging section 31 includes a pair of spiral blades 19, 20, an auger 21, and a horizontal element 26 with its opposite ends connected to annular member 18. An implement 12 in the form of a reversible battery operated variable speed power drill is removably connected by chuck 16 to the upper end 43 of shaft 17 for rotating same in clockwise and counter-clockwise directions. Pressing finger control 14 will cause shaft 17 to rotate, which operates weeder 10.

Many conventional power implements are known in the art. Such implements are capable of controlling the rotation speed, and are powered by rechargeable battery packs or AC current. In particular, power implement 12 may include a rotary dial 11 for selecting the rotation speed of shaft 17. Often, the speed control is combined with the finger control 14 as well known in the art. For tougher weeds and/or harder soil, a faster rotation speed should be selected. Power implement 17 also includes a control 15 for reversing the direction of shaft rotation and is useful in retracting the weeder from the ground.

Shaft 17 may be removed from chuck 43 for cleaning and storing, for example. Shaft 17 has a sufficient length and cross-section for allowing the user to operate weeder 10 without needing to bend over or squat to reach a weed 25. Of course, the height of the user and length of his/her arms, for example, may determine the requisite length and diameter of shaft 17. Accordingly, it is noted that the shaft may be manufactured in sections so that a longer or shorter shaft could be provided with a smaller or larger soil engaging section 31 for adapting to different users and environments. The diameter and length of shaft 17 should be proportionally adjusted whereby the shaft diameter can preferably be between approximately 0.25 inches to 0.5 inches.

Figure 2:
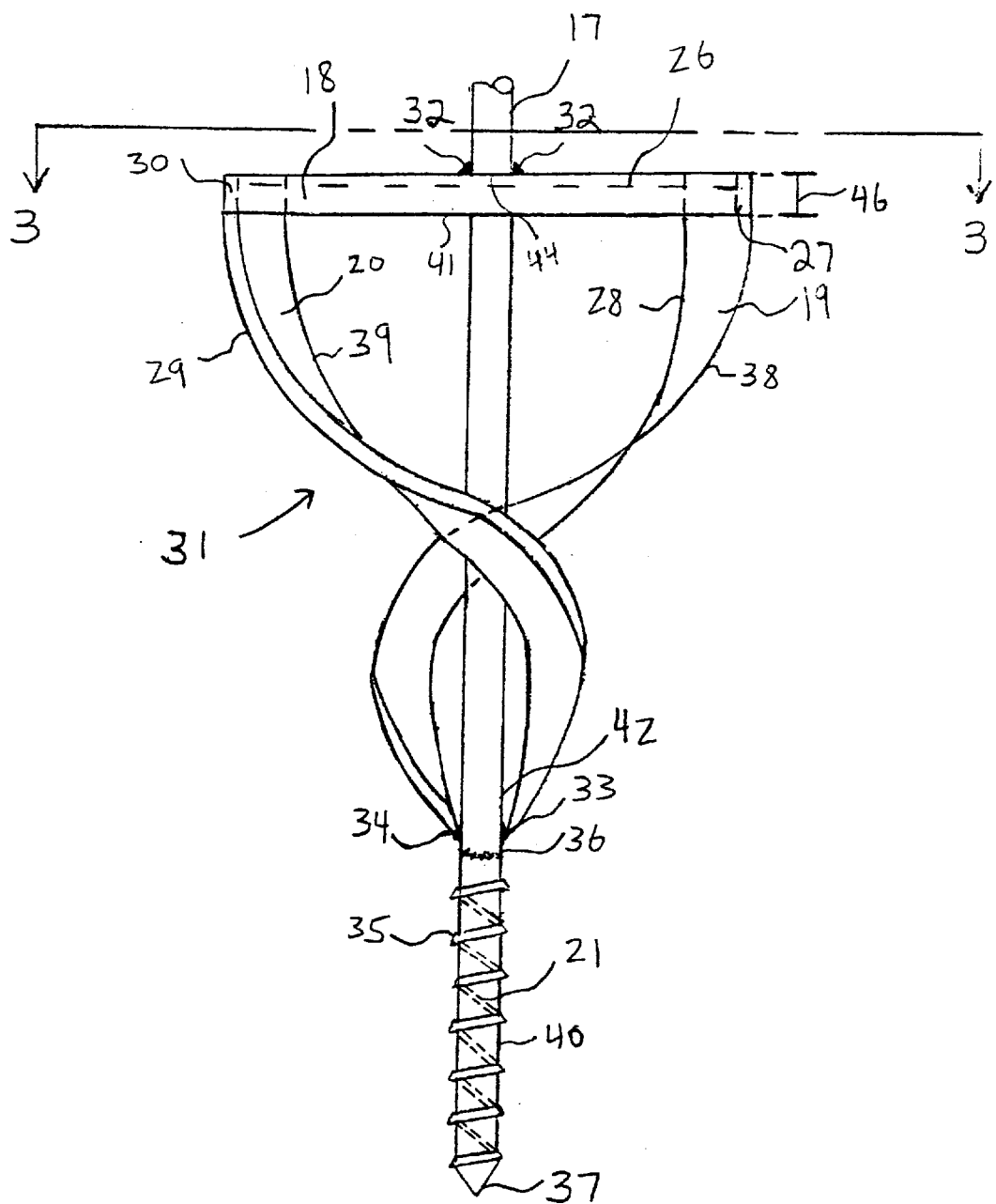
FIG. 2 is an enlarged front elevational view of the soil engaging section of the weeder shown in FIG. 1.
Figure 3:
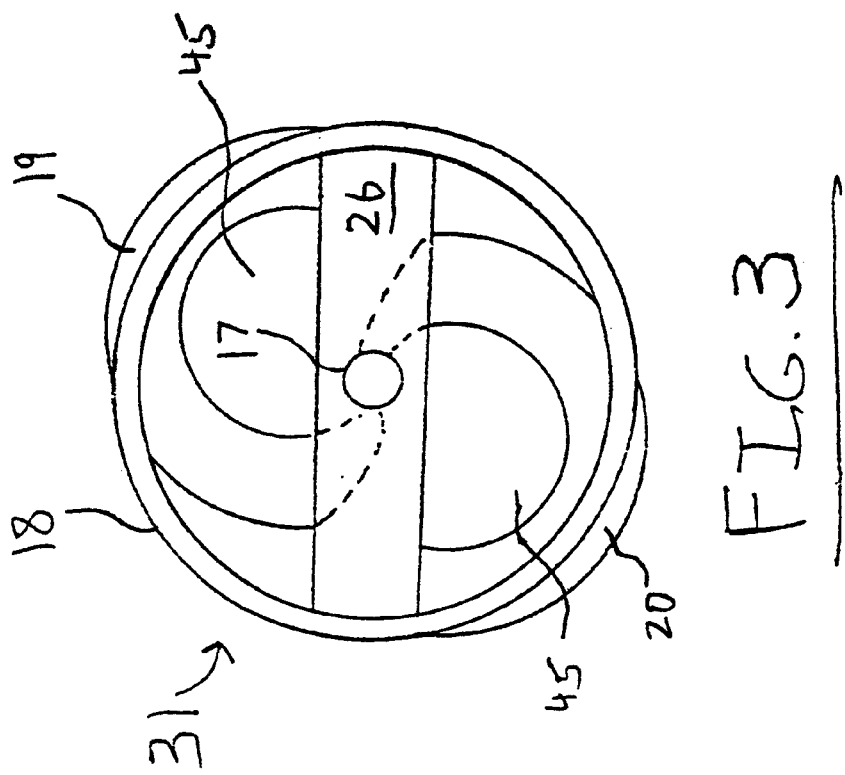
FIG. 3 is a reduced top plan view of the soil engaging section shown in FIG. 2.
Figure 4:
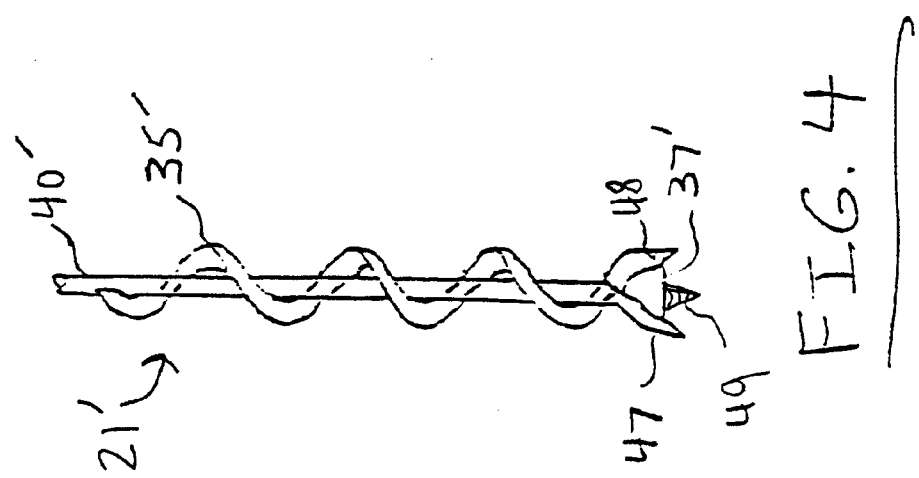
FIG. 4 is an enlarged front elevational view showing an alternate embodiment of the auger shown in FIGS. 1 and 2.

Now referring more particularly to FIGS. 2 and 3, soil-engaging section 31 is located and attached to a lower portion of shaft 17. Annular member 18 forms the top portion of soil engaging section 31 and has a diameter generally defining the cutting diameter of weeder 10 so that the approximate soil cross-section adjacent annular member 18 may be determined for penetrating ground 23 in one vertical motion. Horizontal element 26 is disposed with its opposed ends located within and attached to annular member 18. The annular member and element 26 are preferably formed of steel. Other materials having requisite durability and rigidity may also be used to form such parts. Height 46 of annular member 18 can range between approximately 0.5 inches to 1.5 inches thereby limiting the exposure of top ends 27, 30 of blades 19, 20. Approximately midway along the length of element 26 is an aperture 44. The aperture is substantially equidistant between the opposed ends of element 26 and centrally of annular member 18. The diameter of aperture 44 is sufficient for passage of shaft 17 and is rigidly affixed threat to the shaft as by weld 32.

Blades 19, 20 have corresponding upper ends 27, 30 that are rigidly welded to the bottom surface of element 26 and/or to annular member 18. Lower ends 33, 34 of blades 19, 20 are rigidly welded to and on opposite sides of lower end portion 42 of shaft 17. Upper ends 27, 30 of blades 19, 20 are offset from each other approximately 180 degrees at opposed ends of element 26. As blades 19, 20 converge downwardly in a helical or spiral pattern towards shaft 17, they maintain a uniform and symmetrical spaced relationship from the shaft and form an acute angle with shaft 17 for effectively discharging a weed from ground 23. Blades 19, 20 are approximately four inches apart at upper ends 27, 30 and approximately ¼" to ½" apart at lower ends 34, 33. Of course, weeder 10 may be larger to accomplish boring of larger holes, for example 6" to 8" to permit planting of 6" or 8" potted plants removed from the pots as well as larger vegetation and bulbs, for example.

Element 26 and annular member 18 provide a shield for directing debris and weed roots as they are discharged from blades 19, 20 to be deposited laterally and away from the user. Gap 45 exists between element 26 and within annular member 18 to provide a line of sight for the user to properly position the weeder 10. Advantageously, such a line of sight allows the user to monitor the depth and location of weeder 10 without the requirement of stopping or removing the weeder from ground 23.

Each blade 19, 20 has substantially planar surfaces and corresponding opposed edges 28, 38 and 29, 39 downwardly extending from upper ends 27, 30 to corresponding lower ends 34, 33. Moreover, each blade 19, 20 has a corresponding sharp edge 28, 39 and a dull edge 38, 29. Sharp edges 28, 39 are the inner or leading edges when weeder 10 is rotated in a clockwise direction. Such an orientation of sharp edges 28, 39 is preferred so that roots and hard soil can be more readily cut as blades 19, 20 penetrate a weed 25 and rotate below ground level. As leaf portion 22 and roots 24 of weed 25 are cut, the centripetal force and diverging spiral blade rotation effectively lifts such portions and soil from the ground and discharges same above ground level.

Accordingly, roots 24 are removed from the surrounding earth so that the root system of weed 25 will be rendered incapable of survival. Should any root portions or other debris remain attached to blades 19, 20, they can be removed by rotating weeder 10 above ground 23 in the same or opposite direction for discharging such debris away from blades 19, 20. The dull edges 29, 38 are the trailing edges and cooperate with sharp edges 39, 28 for removing a weed and aerating and tilling soil. Such dull edges 29, 38 follow sharp edges 39, 28 so that same are within the cutting diameter of blades 19, 20 while dull edges 29, 38 are further towards the edge of the cutting diameter. Such an arrangement may help to reduce the likelihood of accidental injury.

As shown in FIGS. 1–3, the auger 21 is in the form of a screw auger or lag screw having a top end 36 that is rigidly welded to lower end 42 of shaft 17. Such a lag screw has a free end 37 for penetrating ground 23 and a weed 25. Various screws known in the art may be used as would occur to those skilled in the art. Elongated body 40 of auger 21 has generally the same shape and cross-section as shaft 17 and includes projections or teeth 35 spiraling down body 40, from top end 36 to free end 37. Preferably, auger 21 should be about 0.5 inches to 2 inches long. Longer penetrating devices may be impractical as blades 19, 20 should be able to reach deep roots initially penetrated by auger 21.

An alternate embodiment 21' of auger 21 is seen in FIG. 5 in a different form than a conventional lag screw. Elongate body 40' preferably has a smaller cross-section surrounded by projections or teeth 35' spiraling about body 40' from top end 36' to free end 37'. Such a free end 37' is wider than free end 37 in the embodiment of FIGS. 1–3 thereby allowing the soil to be more readily moved upwardly by rotation of auger 21' than in the first embodiment described above. Lead screw 49 extends along the longitudinal axis of shaft 17 and is generally medially disposed between spurs 47, 48 of free end portion 37'. Of course, auger 21 may have the form of many known augers such as tapered augers, for example.

In operation, the user places weeder 10 adjacent a typical weed 25 so that free end 37 of auger 21 is in close proximity to ground 23 for effectively removing a weed 25 therefrom. Auger 21 initially engages a portion of weed 25 having leafs or growth 22 above ground. Soil-engaging section 10 then engages weed 25 and topsoil as downward pressure and the rotating action of weeder 10 proceeds to grasp and wind-up roots 24 beneath ground 23, shown in FIG. 1, for example. In combination, auger 21 and blades 19, 20 are able to sever leaf portion 22 and roots 24. Both leaf portion 22 and roots 24 are then withdrawn from the soil upwardly above ground level 23. This withdrawal may be done while weeder 10 is no longer rotating or while it is rotating in the same or reverse direction to more easily perform the withdrawal procedure. After the weeder has removed unwanted weeds and roots from subterranean ground levels, such debris may be quickly removed from topsoil by way of conventional gardening tools such as a rake, for example.

The remaining soil left in the penetrated site is in an aerated state and is loosely retained therein. Very little soil has been withdrawn from the newly formed hole to be left in mounds in proximity to the spot where weed 25 had been removed and the same soil does not form a deeply embedded hole after it has been watered in further operations. If necessary, the user may again use weeder 10 for further aerating and tilling the soil or for digging deeper holes for planting vegetable and bulbs, for example. The depth of the holes may be adjusted as necessary by simply controlling the rectilinear force exerted along the longitudinal axis of shaft 17. Of course, various seeds and bulbs now may be planted in the aerated and tilled soil. Advantageously, a user may operate weeder 10 to weed, aerate and till soil without exerting excessive energy and without having to use different gardening tools.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A multi-purpose weeder attachable to a hand-held rotary power implement, said weeder comprising:
   an elongated vertical shaft having a longitudinal axis between an upper end and a lower end and removably attachable to a power implement for causing rotation of said shaft about said axis, said shaft being of a sufficient vertical length so that a user of said weeder may be generally erect while using said weeder; and
   a soil engaging section including
      a pair of substantially spiral-shaped blades having lower ends connected to said shaft and forming an acute angle with said shaft to cause discharge of weeds dug by said weeder upwardly and outwardly from soil when said shaft is rotated,
      an auger having a free end and a top end connected to said lower end of said shaft, said free end being engagable with a weed and soil so that said weeder will penetrate a weed and simultaneously remove same from soil and thereafter leaving soil in a generally aerated and tilled condition for reuse, and
      an annular member and a cross horizontal element disposed within and connected at its opposed ends to said member, said element having a central aperture for receiving said shaft therethrough, said element being rigidly connected to said shaft about said aperture;
   each of said blades having an upper end rigidly affixed to at least one said element and said member.

2. The multi-purpose weeder of claim 1, wherein each of said blades has a sharpened edge extending between said upper and lower ends of said blades for cutting and removing weeds from soil.

3. The multi-purpose weeder of claim 1, wherein said blades are divergent from said shaft towards said element, said blades converge in a substantially spiral path downward about said shaft.

4. The multi-purpose weeder of claim 1, wherein said pair of opposed ends are spaced between about two inches and eight inches apart from each other.

5. The multi-purpose weeder of claim 1, wherein said auger is between about one-half inch to two inches long.

6. The multi-purpose weeder of claim 1, wherein said shaft has a diameter between about 0.25 inches to 0.50 inches.

7. The multi-purpose weeder of claim 1, wherein said auger is a lag screw for penetrating into a weed and hard soil.

8. The multi-purpose weeder of claim 7, wherein said screw is approximately two inches long.

9. The multi-purpose weeder of claim 7, wherein said screw includes a plurality of spaced spiral projections for moving weed and soil upwardly therethrough to be expended above ground.

10. The multi-purpose weeder of claim 1, wherein said weeder further comprises a rotary implement for rotating said shaft, said implement having direction control so that said weeder is driven in one direction for penetrating ground and driven in an opposite direction for being removed from ground.

11. The multi-purpose weeder of claim 10, wherein said implement is battery-powered.

12. The multi-purpose weeder of claim 10, wherein said implement has variable speed control for adjusting rotational speed of said shaft.

13. The multi-purpose weeder of claim 1, wherein each of said blades includes leading and trailing edges and generally planar surfaces between said edges.

14. The multi-purpose weeder of claim 13, wherein said leading edges are sharpened for initially contacting ground and removing a weed therefrom.

15. The multi-purpose weeder of claim 13, wherein said trailing edges are dull to inhibit accidental injury.

16. The multi-purpose weeder of claim 1, wherein said blades are offset approximately 180 degrees about said shaft.

17. The multi-purpose weeder of claim 1, wherein said blades are equally spaced apart from said shaft substantially along lengths of said blades.

18. The multi-purpose weeder of claim 1, wherein said blades uniformly converge towards each other in a helical path from said upper end to said lower end of said shaft.

19. The multi-purpose weeder of claim 1, wherein said weeder is formed from steel.

20. The multi-purpose weeder of claim 1, wherein said free end of said auger includes a pair of spurs extending therefrom and a lead screw disposed substantially along said axis between said spurs.

* * * * *